(12) United States Patent
Voigt

(10) Patent No.: US 12,480,178 B2
(45) Date of Patent: Nov. 25, 2025

(54) SULPHIDE OXIDATION IN LEACHING OF MINERALS

(71) Applicant: Glencore Technology Pty Limited, Brisbane (AU)

(72) Inventor: Paul Voigt, Brisbane (AU)

(73) Assignee: Glencore Technology Pty Limited, Brisbane (AU)

( * ) Notice: Subject to any disclaimer, the term of this patent is extended or adjusted under 35 U.S.C. 154(b) by 512 days.

(21) Appl. No.: 17/996,014

(22) PCT Filed: Apr. 15, 2021

(86) PCT No.: PCT/AU2021/050335
§ 371 (c)(1),
(2) Date: Oct. 12, 2022

(87) PCT Pub. No.: WO2021/207792
PCT Pub. Date: Oct. 21, 2021

(65) Prior Publication Data
US 2023/0193418 A1 Jun. 22, 2023

(30) Foreign Application Priority Data

Apr. 17, 2020 (AU) ................................ 2020901219
Apr. 28, 2020 (AU) ................................ 2020901336

(51) Int. Cl.
*C22B 3/12* (2006.01)
*C01B 17/64* (2006.01)
(Continued)

(52) U.S. Cl.
CPC ................ *C22B 3/12* (2013.01); *C01B 17/64* (2013.01); *C22B 3/20* (2013.01); *C22B 3/24* (2013.01);
(Continued)

(58) Field of Classification Search
CPC .... C22B 3/12; C22B 3/24; C22B 3/42; C22B 11/04; C22B 3/46; C22B 3/44;
(Continued)

(56) References Cited

U.S. PATENT DOCUMENTS 5,650,057 A * 7/1997 Jones .................. C22B 15/0071
205/602
5,993,635 A 11/1999 Hourn et al.
(Continued)

FOREIGN PATENT DOCUMENTS

EP 1101829 A1 5/2001
WO WO-9629439 A1 9/1996
(Continued)

OTHER PUBLICATIONS

Bal, Heramb; International Search Report; PCT/AU2021/050335; Dated Jul. 1, 2021; 7 pages.
(Continued)

*Primary Examiner* — Adil A. Siddiqui
(74) *Attorney, Agent, or Firm* — Bradley Arant Boult Cummings LLP

(57) ABSTRACT

A process for leaching minerals that contain metal sulphides and one or more precious metals or precious metal compounds, the process comprising the steps of a first leaching step to leach the minerals under oxidative conditions at a pH of less than 4 to form a slurry or pulp, the slurry or pulp comprising a solid phase containing unreacted components, solid reaction products and elemental sulphur, and subjecting the slurry or pulp or solid residue from the first leaching step to a second leaching step comprising oxidative leaching at pH of at least 9.0 to thereby form thiosulphate, whereby the thiosulphate leaches precious metal from the solid residue.

20 Claims, 2 Drawing Sheets

(51) Int. Cl.
　　　*C22B 3/20*　　　(2006.01)
　　　*C22B 3/24*　　　(2006.01)
　　　*C22B 3/42*　　　(2006.01)
　　　*C22B 3/44*　　　(2006.01)
　　　*C22B 3/46*　　　(2006.01)
　　　*C22B 11/00*　　(2006.01)
　　　*C22B 15/00*　　(2006.01)

(52) U.S. Cl.
　　　CPC .............. *C22B 3/42* (2013.01); *C22B 11/04* (2013.01); *C22B 15/0067* (2013.01); *C22B 15/008* (2013.01); *C22B 3/44* (2013.01); *C22B 3/46* (2013.01); *C22B 15/0063* (2013.01); *C22B 15/0065* (2013.01); *C22B 15/0089* (2013.01); *Y02P 10/20* (2015.11)

(58) Field of Classification Search
　　　CPC ............. C22B 15/0067; C22B 15/008; C22B 15/0063; C22B 3/20; C22B 15/0065; C22B 15/0089; Y02P 10/20; C01B 17/64
　　　See application file for complete search history.

(56) References Cited

U.S. PATENT DOCUMENTS

| | | | |
|---|---|---|---|
| 6,660,059 B2* | 12/2003 | Ji | C22B 11/04 75/744 |
| 6,833,021 B1 | 12/2004 | Hourn et al. | |
| 10,190,193 B2 | 1/2019 | Hourn et al. | |
| 2016/0258038 A1* | 9/2016 | Hourn | C22B 34/22 |
| 2023/0147263 A1 | 5/2023 | Voigt | |

FOREIGN PATENT DOCUMENTS

| | | |
|---|---|---|
| WO | WO-9641029 A2 | 12/1996 |
| WO | WO-0017407 A1 | 3/2000 |
| WO | WO-2001007407 A1 | 2/2001 |
| WO | WO-2001088212 A2 | 11/2001 |
| WO | WO-2004004294 A1 | 1/2004 |

OTHER PUBLICATIONS

Mathe, Vijaya; International Search Report; PCT/AU2021/050334; Dated Jun. 21, 2021; 5 pages.

* cited by examiner

SULPHIDE OXIDATION IN LEACHING OF MINERALS

TECHNICAL FIELD

The present invention relates to a process for leaching minerals.

BACKGROUND ART

The Albion Process™ is an atmospheric leaching process developed by Mount Isa Mines, now Glencore Technology, in 1994. The Albion Process™ can operate under three operating regimes, namely, acidic (around pH 1.0), neutral (around pH 5.0) and alkaline (around pH 9.0). Acid Albion Process™ Leaching (AAL) conditions are generally employed for the treatment of iron sulphide and base metal concentrates as described by WO 96/29439. Neutral Albion Process™ Leaching (NAL) and Alkaline Albion Process™ Leaching (HAAL) are generally employed for the treatment of non base metal concentrates such as iron sulphide and iron-arsenic sulphide concentrates as described in WO 00/17407. The objective of the Albion Process™ is oxidation of sulphides to allow liberation of metals for downstream recovery. The Albion Process™ comprises two fundamental steps. The first is mechanical liberation through the action of fine grinding, most suitably achieved in an IsaMill™ horizontal grinding plant. The second is oxidation of the finely ground feed at atmospheric pressure utilising supersonic oxygen injection and specially designed Oxidative Leach Reactors to maximise oxygen utilisation and process efficiency.

In the AAL system, concentrates may be fed that contain both base metals and precious metals. In this case, some base metals are solubilised in the Albion Process™ and leached into solution whereas the precious metals such as gold, silver, platinum, palladium and other known precious metals remain in the solid phase. Once the base metals are in solution, the liquid and solid phases can be separated by well known means with the solution stream proceeding to downstream metals recovery.

Following the AAL process and after removal of around 99% of the base metals from the feed material, the now depleted residue contains precious metals along with other components including elemental sulphur, iron oxides (goethite), iron sulphate complexes such as jarosite, insoluble salts such as lead sulphate, insoluble or unreacted gangue and any unreacted sulphides such as pyrite. Ordinarily, the slurry is directed to a process to recover the precious metals. The incumbent processes for the recovery of precious metals from a solid feeds are the family of cyanidation processes commonly employed in the gold industry to recover gold from free milling ores. This process involves contacting the slurry with sodium cyanide at an elevated pH (above 10.0) in the presence of mild oxidative conditions to leach the gold and other precious metals into solution. The gold is recovered from solution by contacting the solution with an adsorbent such as activated carbon or ion exchange resin. In the case or carbon, the carbon can be in-situ in the cyanidation process (Carbon-In-Leach) or by contacting the gold bearing solution with carbon in a separate contacting tank (Carbon-In-Pulp).

In the AAL system, processing problems can arise when sending the leach residue directly to cyanidation. One problem is that elemental sulphur present in the residue tends to consume cyanide forming thiocyanates in addition to leaching precious metals which results in increased cyanide consumption and hence operating costs. Generation of thiocyanates presents an environmental issue because once thiocyanates are generated they are difficult to destroy in conventional detox systems. Another problem is that precious metals can be locked in the reaction products from the Albion Process™ leach conditions such as iron complexes resulting in poor recovery in downstream cyanidation.

To avoid the problem of elemental sulphur in the cyanidation process, it can be removed through a number of processes after or during generation but before cyanidation. The problem is that these processes are not always exclusively selective to elemental sulphur, which means an important portion of the precious metals can report to the elemental sulphur stream rather than staying with the residue to be subjected to cyanidation.

It will be clearly understood that, if a prior art publication is referred to herein, this reference does not constitute an admission that the publication forms part of the common general knowledge in the art in Australia or in any other country.

SUMMARY OF INVENTION

The present invention is directed to a process for leaching minerals, which may at least partially overcome at least one of the abovementioned disadvantages or provide the consumer with a useful or commercial choice.

With the foregoing in view, the present invention in one form, resides broadly in a process for leaching minerals, the minerals containing metal sulphides and one or more precious metals or precious metal compounds, the process comprising the steps of leaching the minerals under oxidative conditions at a pH of less than 4 to form a slurry or pulp, the slurry or pulp comprising a solid phase containing unreacted components, solid reaction products and elemental sulphur, and subjecting the slurry or pulp to oxidative leaching at pH of at least 9.0 to thereby form thiosulphate, whereby the thiosulphate leaches precious metal from the solid residue.

In a second aspect, the present invention provides a process for leaching minerals, the minerals containing metal sulphides and one or more precious metals or precious metal compounds, the process comprising the steps of leaching the minerals under oxidative conditions at a pH of less than 4 to form a pregnant leach liquor containing dissolved metal and a solid residue containing unreacted components, solid reaction products and elemental sulphur, separating the solid residue from the pregnant leach liquor, and subjecting the solid residue to oxidative leaching at pH of at least 9.0 to thereby form thiosulphate, whereby the thiosulphate leaches precious metal from the solid residue.

In one embodiment, the process further comprises separating a leach liquor from the step of oxidative leaching at pH of at least 9.0 and recovering precious metals from the leach liquor.

In the present invention, the minerals are subjected to a first leaching step conducted under oxidative conditions at a pH of less than 4, or at a pH of less than 3, or at a pH of less than 2.0 and the solid residue from the first leaching step is subjected to a second leaching step under oxidative conditions and under alkaline conditions, typically at a pH of greater than 9.0. Elemental sulphur is formed in the first leaching step and the elemental sulphur is separated from the pregnant leach liquor with the solid residue. In the second leaching step, the elemental sulphur reacts with oxygen at the alkaline pH to form thiosulphate in-situ. Thiosulphate is a known lixiviant for precious metals, especially gold. As a result, the precious metals and leached into solution in the second leaching step and can be recovered from the leach liquor arising in the second leaching step.

In another embodiment, the slurry formed in the first leaching step is sent to the second leaching step without requiring solid/liquid separation. An optional intermediate neutralisation step, which may be accomplished by using an inexpensive neutralising agent/alkali, may be used to increase the pH of the slurry or pulp prior to feeding the slurry or pulp to the second leaching step.

In one embodiment, the leaching liquor from the second leaching step is separated from the solids and dissolved precious metals are recovered therefrom. The dissolved precious metals may be recovered by any known means, such as absorption onto activated carbon, precipitation or cementation. The skilled person would readily understand how these processes are operated and further description of these processes for recovering precious metals from the leach liquor from the second leaching step need not be provided.

Advantageously, unreacted sulphides that are present in the solid residue fed to the second leaching step, such as pyrite, would also be oxidised in the second leaching step. Further, the elevated pH and oxidising conditions will also promote the breakdown of any solid reaction products formed in the first leaching step operated under oxidising conditions and acidic conditions, thereby making those reaction products amenable to leaching with thiosulphate. The resulting effect is that precious metals are leached into solution in the second leaching step and can be recovered from the leach liquor. As a further benefit of the high pH oxidation that is taking place in the second leaching step, elemental sulphur that is present will be destroyed, meaning that if the solid residue from the second leaching step is directed to a cyanidation step to supplement the action of thiosulphate, the formation of persistent and problematic thiocyanate will be minimised. In the second leaching step, the elemental sulphur is consumed, meaning that it does not present any issues for acid generation in the tailings management facility.

The first leaching step which is operated under oxidative conditions and under acidic conditions, may be operated as described in international patent application publication number WO 96/29439 (equivalent to U.S. Pat. No. 5,993,635), the entire contents of which are incorporated herein by cross-reference. A brief description of these conditions will be discussed hereunder.

The first leaching step is conducted at a pH of less than 4, or at a pH of less than 3, or at a pH of less than 2.0, or at a pH of less than 1.5, or at a pH of 1.0 or less. Sulphuric acid may be used to obtain the desired pH in the first leaching step, although other acids can also be used.

In some embodiments of the present invention, the minerals that are fed to the first leaching step are finely ground. In some embodiments, the minerals that are fed to the first leaching step are ground such that they have a $P_{80}$ of 20 µm or less.

The minerals that are treated in accordance with the present invention may comprise a sulphide mineral composition. Such compositions include ores and concentrates. The process of the present invention is especially suitable for processing concentrates. Examples of suitable materials include chalcopyrite, bornite, enargite, pyrite, covellite, sphalerite, chalcocite, pentlandite, cobaltite, pyrrhotite or mixtures of any two or more thereof. Metals which can be extracted from the mineral compositions according to the method of the first embodiment include copper, zinc, nickel and cobalt. The concentrate grade may range from very low such as for example with copper containing materials 7-8 wt % copper to high grade concentrates having about 26 wt % copper.

The sulphide mineral composition will typically contain iron in the form of iron sulphides. Under the conditions prevalent in the first leaching step, at least some of the iron sulphides will dissolve into solution. Ferrous ions are oxidised to ferric ions and the ferric ions will take part in at least some of the leaching reactions. Any ferrous ions that are formed as a result of ferric ions taking part in the leaching reactions will be re-oxidised to ferric ions.

The process of the present invention may include the step of precipitating iron from the pregnant leaching solution generated in the first leaching step. For example, iron may be precipitated by increasing the pH to precipitate an insoluble iron compound.

In one embodiment, the sulphide minerals that are fed to the first leaching step are subject to fine grinding in a mill, such as a stirred mill. The sulphide mineral may be ground to a maximum average particle size of 80% passing size of 20 microns as measured with a laser sizer. In the present specification and claims the term $P_{80}$ is used to describe the size at which 80% of the mass of the material will pass. Preferably the particle size is $P_{80}$ of 12 micron or less. The desired particle size may vary with the type of mineral species used. Especially preferred particle sizes for different concentrates, expressed as $P_{80}$, are chalcopyrite/bornite—12 micron; enargite—10 micron; pyrite—10 micron; covellite—18 micron; chalcocite—18 micron; pentlandite—12 micron and cobaltite—12 micron.

In most embodiments of the present invention, the first leaching step is conducted at atmospheric pressure and at a temperature up to the boiling point of the mixture. The temperature that the first leaching step is conducted is preferably less than 100° C.

In one embodiment, oxidative leaching conditions are obtained in the first leaching step by sparging with an oxygen containing gas. The gas may be air, or oxygen, or oxygen enriched air.

The mixture of solid residue and pregnant leach solution from the first leaching step may be separated using any known liquid/solid separation technique, including filtration, sedimentation, clarification and the like. The solid residue may be washed with wash water to remove any residual leach liquor therefrom.

The solid residue is then treated in the second leaching step. In the second leaching step, oxidative leaching at pH of at least 9.0 occurs. Embodiments, the solid residue following solid/liquid separation and washing is repulped with process water and the pH raised to above 9.0 using any known alkali. Lime or sodium hydroxide may be suitable, although other alkalis/bases may also be used. If required, the residue could be re-ground prior to the second leaching step, such as following the re-pulping process, if this improves precious metals recovery. Oxygen would be introduced to the slurry and, in the presence of elemental sulphur, form thiosulphate in-situ. Unreacted sulphides that would be slow leaching in the AAL system (which is the first leaching step), such as pyrite, would also be oxidised. Thiosulphate is a known lixiviant for precious metals especially gold. The elevated pH and oxidising conditions would also promote the breakdown of Albion Process™ reaction products, being reaction products formed in the first leaching step, and making them amenable to leaching with thiosulphate. The resulting effect is that precious metals are leached into solution and can be recovered by any known means such as adsorption onto activated carbon, precipitation or cementation. If required, the slurry or solid residue from the second leaching step can be directed to a cyanidation process to supplement the action of the thiosulphate. The benefit of the high pH oxidation is that elemental sulphur will be destroyed meaning that if the residue is directed to cyanidation, the formation of persistent and problematic thiocyanate will be minimised. The elemental sulphur in the leach residue is consumed meaning that it does not present any issues for acid generation in the tailings management facility.

In one embodiment, a leach liquor containing dissolved precious metal is separated from the solid residue from the second leaching step and precious metal is recovered from the leach liquor. The solid residue may be subjected to further treatment to recover precious metal therefrom. The further treatment to recover precious metal from the solid residue may comprise a cyanidation treatment.

In a third aspect, the present invention provides process for leaching minerals that contain metal sulphides and one or more precious metals or precious metal compounds, the process comprising the steps of a first leaching step to leach the minerals under oxidative conditions at a pH of less than 4 to form a slurry or pulp, the slurry or pulp comprising a solid phase containing unreacted components, solid reaction products and elemental sulphur, and subjecting the slurry or pulp or solid residue from the first leaching step to a second leaching step comprising oxidative leaching at pH of at least 9.0 to thereby form thiosulphate, whereby the thiosulphate leaches precious metal from the solid residue.

Throughout this specification, the term "precious metal" includes gold and/or silver.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

DESCRIPTION OF EMBODIMENTS

Figure 1:
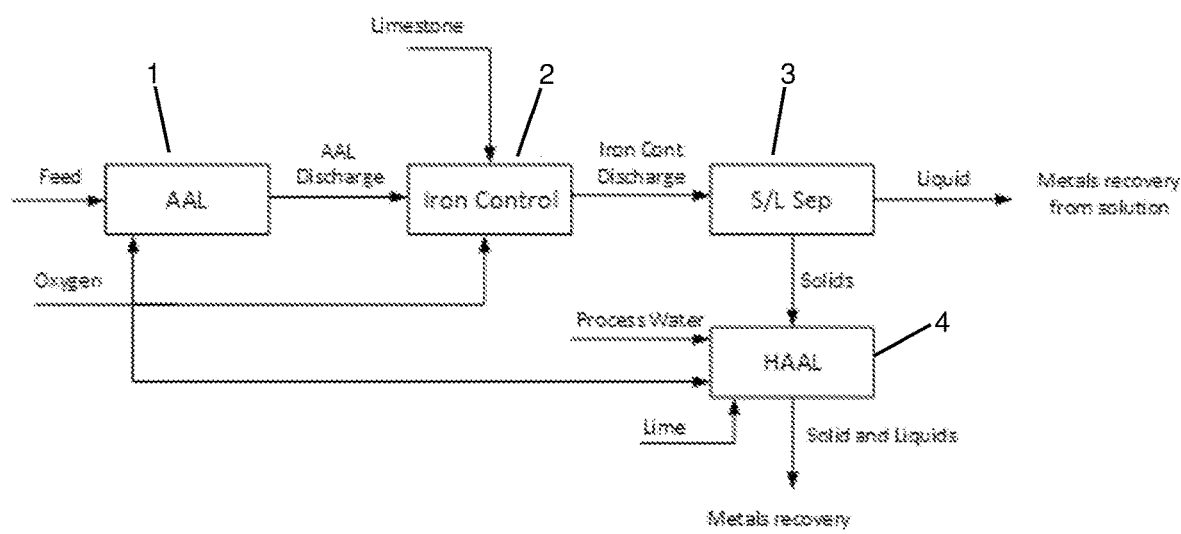
FIG. 1 shows a flowsheet of a process in accordance with one embodiment of the present invention.

It will be understood that the drawings have been provided for the purposes of illustrating preferred embodiments of the present invention. Therefore, the skilled person will appreciate that the present invention should not be considered to be limited solely to the features as shown in the drawings.

Turning to FIG. 1, the first leaching step 1 of the process involves feeding a sulphide material to an acid Albion Process, as described in WO 96/29439. After oxidation of sulphides and extraction of the soluble metals into solution, iron is removed from solution through an iron control step 2. Iron removal can be achieved using methods that are known to those skilled in the art. For example, limestone can be added to cause precipitation of insoluble iron compounds.

Some gypsum may also be formed in the iron control step 2. Arsenic can also be removed in the iron control step 2, as will be known to those skilled in the art, to thereby avoid or minimise the amount of arsenic entering the second leaching step that comprises an elevated pH oxidation stage.

After iron removal a separation step occurs to separate solids from liquid. At this stage, the liquid contains valuable dissolved metals such as copper, zinc, nickel and cobalt. Any common method for solid/liquid separation technique can be employed to those skilled in the art including thickening and filtration or with a counter-current decantation (CCD) circuit (Step 3). Solid/liquid separations is important because dissolved metals will be precipitated when elevating the pH in the next step, lost to tails and potentially consume cyanide in a precious metals recovery step.

Figure 2:
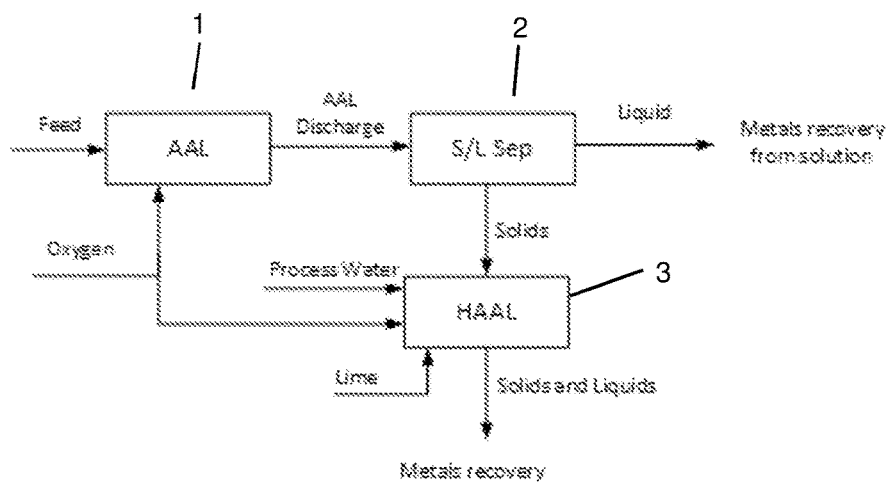
FIG. 2 shows a flowsheet of the process in accordance with another embodiment of the present invention.

It should be noted that the iron removal step can be partially performed before and after separation of Albion Process™ leach residue solids and liquids or entirely after separation of Albion Process™ leach residue solids and liquids. The version of the flowsheet where iron removal occurs after the solid/liquid separation of the Albion Process™ leach residue is shown in FIG. 2.

The leach residue solids, now separated and washed from process liquor containing the majority of dissolved metals, is re-pulped in process water to around 30% solids and fed to the HAAL circuit which comprises between one and six Oxidative Leach Reactors (Step 4). The slurry density can be optimised to ensure the correct concentration of thiosulphate is formed in solution.

The pH is raised to at least pH 9.0 but more favourably pH 10.0 with any known alkali, with a calcium based alkali typically being most economical. For example, in the second leaching step 4, lime is added to increase the pH to at least 9.0.

Oxygen is injected to the base of the HAAL reactors with oxygen, more favourably with the HyperSparge™ supersonic gas injector to maximise oxygen utilisation. The oxygen injection and elevated pH serves a number of duties in the HAAL circuit.

The first is to oxidise any slow leaching sulphides hosting precious metals such as pyrite.

The second is to oxidise elemental sulphur to form thiosulphate which will in turn leach precious metals from the leach residue.

The third is for the breakdown of iron complexes formed as reaction products of the Albion Process™ which lock precious metals from leaching with thiosulphate or downstream cyanidation such as jarosites.

The fourth is for the breakdown of refractory compounds which lock precious metals from leaching with thiosulphate or downstream cyanidation such as tellurides.

The residence time in the process is typically 6 to 48 hours depending on the quantity of elemental sulphur generated in the Albion Process™ and the leaching kinetics of precious metals in the presence of thiosulphate. The HAAL leaching train may comprise a single or several Oxidative Leach Reactors.

The process will operate autothermally with the heat of reactions driving the operating temperature. No external cooling or heating is required.

Once the precious metals are dissolved in solution, they may be passed to a process for the recovery of the precious metals from solution such as adsorption to carbon, precipitation with known precipitating agents or adsorption to an ion exchange resin.

Additionally, the HAAL process can be performed in the presence of adsorbents in a similar way to the CIL process.

This means activated carbon or ion exchange resin would also be present in the HAAL circuit to adsorb precious metals as they are solubilised. Precious metals are then recovered from adsorbents by those skilled in the art.

If the thiosulphate generation from the reaction of elemental sulphur is insufficient for complete leaching of the precious metals, then conditions can be generated where more thiosulphate is generated or added from an external source. Alternatively, the slurry can be directed to a cyanidation circuit to maximise recovery of precious metals.

In embodiments of the present invention, a separated and washed solid residue from and acidic oxidative leaching process is slurried with process water in an Albion Process™ Leach Reactor and the pH increased to at least 9.0 with an alkali. The solids density is adjusted in the re-slurrying process and with makeup water addition to ensure the thiosulphate concentration is sufficient for precious metals leaching. Oxygen is injected into the base of the reactor with a supersonic oxygen injector. Slow leaching sulphides are oxidised, resulting in liberation of precious metals for in-situ leaching and downstream leaching and recovery. Thiosulphate is generated in situ by the oxidation of elemental sulphur and will leach precious metals out of the leach residue. Precious metals locked in Albion Process™ reaction products are liberated for in-situ leaching and downstream leaching and recovery. Precious metals locked in compounds that remain refractory in the first leaching step are liberated for in-situ leaching and downstream leaching and recovery. The resulting system can be supplemented with thiosulphate by creating conditions for in-situ formation or addition of extra thiosulphate from an external source of thiosulphate, or cyanide, or directed to a cyanidation process. The process can be run in the presence of an adsorbent such as activated charcoal or an ion exchange resin to adsorb the precious metals leached into solution with thiosulphate generated from the oxidation of elemental sulphur, external supplement thiosulphate or with cyanide. The precious metals can be recovered from the adsorbents by techniques that are known to those skilled in the art.

Figure 3:
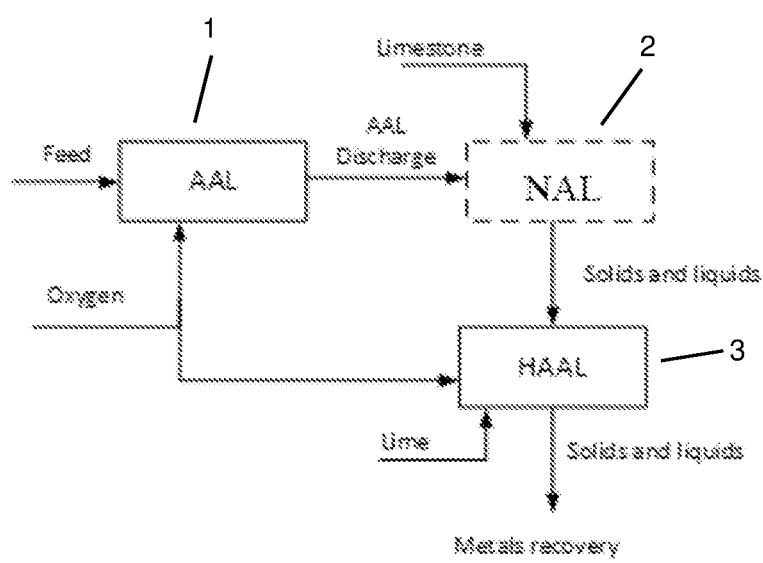
FIG. 3 shows a flowsheet of another embodiment of the present invention.

FIG. 3 shows a process flowsheet of another embodiment of the present invention. In the flowsheet of FIG. 3, the slurry in the first leaching step 1 is not separated into separate solid and liquid fractions (as occurs in the flowsheets of FIGS. 1 and 2). Rather, the slurry from the first leaching step 1 is sent to the second leaching step 3 without undergoing solid/liquid separation. The slurry may be subject to an intermediate neutralization step 2, in which the pH of the slurry is raised by using an inexpensive neutralizing agent or alkali, such as limestone, prior to feeding the slurry to the second leaching step 3. This may reduce alkali costs in the flowsheet of FIG. 3.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A process for leaching minerals, the minerals containing metal sulphides and one or more precious metals or precious metal compounds, the process comprising the steps of leaching the minerals under oxidative conditions at a pH of less than 4 to form a slurry or pulp, the slurry or pulp comprising a solid phase containing unreacted components, solid reaction products, and elemental sulphur, and subjecting the slurry or pulp to oxidative leaching at pH of at least 9.0 to thereby form thiosulphate, whereby the thiosulphate leaches precious metal from the solid residue.

2. The process as claimed in claim 1, further comprising separating a leach liquor from the step of oxidative leaching at pH of at least 9.0 and recovering precious metals from the leach liquor.

3. The process as claimed in claim 1, wherein the minerals are subjected to a first leaching step conducted under oxidative conditions at a pH of less than 4, and the solid residue from the first leaching step is subjected to a second leaching step conducted under oxidative conditions and under alkaline conditions, at a pH of greater than 9.0.

4. The process as claimed in claim 3, wherein elemental sulphur is formed in the first leaching step and the elemental sulphur is separated from pregnant leach liquor with the solid residue and in the second leaching step, the elemental sulphur reacts with oxygen at the alkaline conditions to form thiosulphate in-situ, and the precious metals are leached into solution in the second leaching step.

5. The process as claimed in claim 1, wherein the slurry formed in the first leaching step is sent to the second leaching step without subjecting the slurry to solid/liquid separation.

6. The process as claimed in claim 5, wherein an intermediate neutralisation step is performed to increase the pH of the slurry or pulp prior to feeding the slurry or pulp to the second leaching step.

7. The process as claimed in claim 1, wherein the leaching liquor from the second leaching step is separated from the solids and dissolved precious metals are recovered therefrom.

8. The process as claimed in claim 1, wherein unreacted sulphides that are present in the solid residue fed to the second leaching step are also oxidised in the second leaching step and breakdown of solid reaction products formed in the first leaching step also occurs in the second leaching step, whereby precious metals are leached into solution in the second leaching step and are recovered from the leach liquor, and elemental sulphur that is present is consumed.

9. The process as claimed in claim 1, wherein the first leaching step is conducted at a pH of less than 4.

10. The process as claimed in claim 1, wherein the minerals that are fed to the first leaching step are finely ground.

11. The process as claimed in claim 10, wherein the minerals that are fed to the first leaching step are ground such that they have a $P_{80}$ of 20 μm or less.

12. The process as claimed in claim 1, wherein the minerals comprise a sulphide mineral composition, ore or concentrate.

13. The process as claimed in claim 1, wherein the minerals are selected from one or more of chalcopyrite, bornite, enargite, pyrite, covellite, sphalerite, chalcocite, pentlandite, cobaltite, pyrrhotite or mixtures of any two or more thereof.

14. The process as claimed in claim 1, wherein sulphide minerals fed to the first leaching step are subject to fine grinding in a mill and ground to a maximum average particle size of 80% passing size of 20 microns as measured with a laser sizer, or ground to a particle size distribution having a $P_{80}$ of 12 micron or less.

15. The process as claimed in claim 1, wherein the first leaching step is conducted at atmospheric pressure and at a temperature up to the boiling point of the mixture.

16. The process as claimed in claim 1, wherein oxidative leaching conditions are obtained in the first leaching step by sparging with an oxygen-containing gas.

17. The process as claimed in claim 1, wherein the mixture of solid residue and pregnant leach solution from the first leaching step is separated using a liquid/solid separation technique, selected from filtration, sedimentation, clarification, and the solid residue is optionally washed with wash water to remove any residual leach liquor therefrom.

18. The process as claimed in claim 17, wherein the solid residue is treated in a second leaching step under oxidative conditions, and at a pH of at least 9.0, and during which: (i) unreacted sulphides from the first leaching step are oxidized, and (ii) elemental sulphur in the solid residue is reacted to form thiosulphate.

19. The process as claimed in claim 1, wherein a leach liquor containing dissolved precious metal is separated from the solid residue from the second leaching step, and precious metal is recovered from the leach liquor.

20. A process for leaching minerals, the minerals containing metal sulphides and one or more precious metals or precious metal compounds, the process comprising the steps of leaching the minerals under oxidative conditions at a pH of less than 4 to form a pregnant leach liquor containing dissolved metal and a solid residue containing unreacted components, solid reaction products and elemental sulphur, separating the solid residue from the pregnant leach liquor, and subjecting the solid residue to oxidative leaching at pH of at least 9.0 to thereby form thiosulphate, whereby the thiosulphate leaches precious metal from the solid residue.

\* \* \* \* \*